United States Patent
Szostek et al.

(10) Patent No.: US 10,487,901 B2
(45) Date of Patent: Nov. 26, 2019

(54) DAMPING STRUT

(71) Applicant: BeijingWest Industries Co., Ltd., Beijing (CN)

(72) Inventors: Tomasz Roman Szostek, Cracow (PL); Rafal Konrad Kiwior, Cracow (PL)

(73) Assignee: BEIJINGWEST INDUSTRIES CO., LTD., Beijing (CN)

( * ) Notice: Subject to any disclaimer, the term of this patent is extended or adjusted under 35 U.S.C. 154(b) by 38 days.

(21) Appl. No.: 15/817,092

(22) Filed: Nov. 17, 2017

(65) Prior Publication Data

US 2018/0328443 A1  Nov. 15, 2018

Related U.S. Application Data

(60) Provisional application No. 62/443,834, filed on Jan. 9, 2017.

(51) Int. Cl.
*F16F 9/36* (2006.01)
*F16F 9/32* (2006.01)
(Continued)

(52) U.S. Cl.
CPC ............ *F16F 9/3278* (2013.01); *F16F 9/365* (2013.01); *F16F 9/369* (2013.01); *B60G 15/062* (2013.01);
(Continued)

(58) Field of Classification Search
CPC .... F16F 9/3278; F16F 9/19; F16F 9/36; F16F 9/363; F16F 9/369; F16F 9/535
See application file for complete search history.

(56) References Cited

U.S. PATENT DOCUMENTS

| 3,524,658 A | 8/1970 | Carbon |
| 3,690,425 A | 9/1972 | Willich et al. |
| (Continued) | | |

FOREIGN PATENT DOCUMENTS

| CN | 2285143 | 7/1998 |
| DE | 3301774 | 7/1984 |
| (Continued) | | |

OTHER PUBLICATIONS

Extended European Search Report dated Jun. 1, 2018 for counterpart European Patent Application No. EP18150435.8, Eight Pages.
(Continued)

*Primary Examiner* — Bradley T King
(74) *Attorney, Agent, or Firm* — William H. Honaker; Dickinson Wright PLLC

(57) ABSTRACT

Disclosed is a magneto-rheological strut comprising a housing tube, a damper body tube, and a bearing assembly disposed between the housing tube and the damper body tube. The bearing assembly comprises a bearing sleeve, with two integral annular bearings within the bearing sleeve and bearing against the damper body tube, and two internal annular seals abutting the radially external surface of the damper body tube and defining a fluid-tight internal lubricant chamber between the internal annular seals. The bearing assembly further comprises two external annular seals abutting the internal surface of the housing tube and defining an external lubricant chamber between the external annular seals and the housing tube. The bearing sleeve further comprises a number of radial channels passing through its wall and joining the internal lubricant chamber with the external lubricant chamber.

10 Claims, 4 Drawing Sheets

(51) Int. Cl.
*B60G 15/06* (2006.01)
*F16F 9/18* (2006.01)
*F16F 9/53* (2006.01)

(52) U.S. Cl.
CPC ...... *B60G 2202/31* (2013.01); *B60G 2206/41* (2013.01); *B60G 2206/71* (2013.01); *B60G 2206/81012* (2013.01); *F16F 9/18* (2013.01); *F16F 9/535* (2013.01); *F16F 2224/02* (2013.01); *F16F 2226/00* (2013.01); *F16F 2230/04* (2013.01); *F16F 2230/28* (2013.01)

(56) References Cited

U.S. PATENT DOCUMENTS

| | | | |
|---|---|---|---|
| 4,290,511 A | 9/1981 | de Baan et al. | |
| 5,433,409 A | 7/1995 | Knopp | |
| 6,003,848 A * | 12/1999 | Cotter | F16F 9/0218 |
| | | | 188/322.16 |
| 6,105,945 A | 8/2000 | Takeuchi et al. | |
| 6,382,369 B1 | 5/2002 | Lisenker | |
| 6,474,619 B1 | 11/2002 | Ma | |
| 6,497,308 B2 | 12/2002 | Lisenker | |
| 6,497,309 B1 | 12/2002 | Lisenker | |
| 6,547,044 B2 * | 4/2003 | Lisenker | B60G 13/008 |
| | | | 188/267 |
| 6,840,358 B2 * | 1/2005 | Kos | F16F 9/362 |
| | | | 188/321.11 |
| 8,474,850 B2 * | 7/2013 | Pasino | B62K 25/08 |
| | | | 188/282.1 |
| 2002/0130000 A1 | 9/2002 | Lisenker et al. | |
| 2002/0130001 A1 | 9/2002 | Lisenker | |
| 2008/0152271 A1 | 6/2008 | Barlerin et al. | |
| 2011/0042915 A1 | 2/2011 | Felsl et al. | |
| 2011/0153158 A1 * | 6/2011 | Acocella | B62K 25/04 |
| | | | 701/37 |
| 2011/0235955 A1 | 9/2011 | Lee et al. | |
| 2012/0111998 A1 * | 5/2012 | Bennett | F16F 9/367 |
| | | | 244/100 R |
| 2012/0328224 A1 | 12/2012 | Lee | |
| 2013/0108483 A1 | 5/2013 | Becker et al. | |
| 2014/0062057 A1 * | 3/2014 | Battlogg | B62K 25/08 |
| | | | 280/276 |
| 2014/0145483 A1 | 5/2014 | Kim et al. | |
| 2016/0017953 A1 * | 1/2016 | Lee | B64C 25/60 |
| | | | 188/297 |

FOREIGN PATENT DOCUMENTS

| | | |
|---|---|---|
| DE | 19636202 | 3/1998 |
| EP | 0168663 | 6/1985 |
| EP | 0490386 | 6/1992 |
| EP | 0490386 A2 | 6/1992 |
| EP | 0553440 | 12/1992 |
| EP | 0802346 | 10/1997 |
| EP | 0899134 | 3/1999 |
| EP | 1279857 | 1/2003 |
| EP | 2239481 | 10/2010 |
| EP | 2394897 | 12/2011 |
| GB | 2237095 A | 4/1991 |
| JP | 06127452 | 5/1994 |
| JP | 2002089606 | 9/2000 |
| JP | 2011012786 | 7/2009 |

OTHER PUBLICATIONS

First Office Action and Search Report dated Feb. 11, 2019 for corresponding Chinese Patent Application 2017-11202993.0 and translation.

Second Office Action and search report dated Jul. 8, 2019 for counterpart Chinese patent application No. 201711202993.0, along with machine EN translation downloaded from EPO.

* cited by examiner

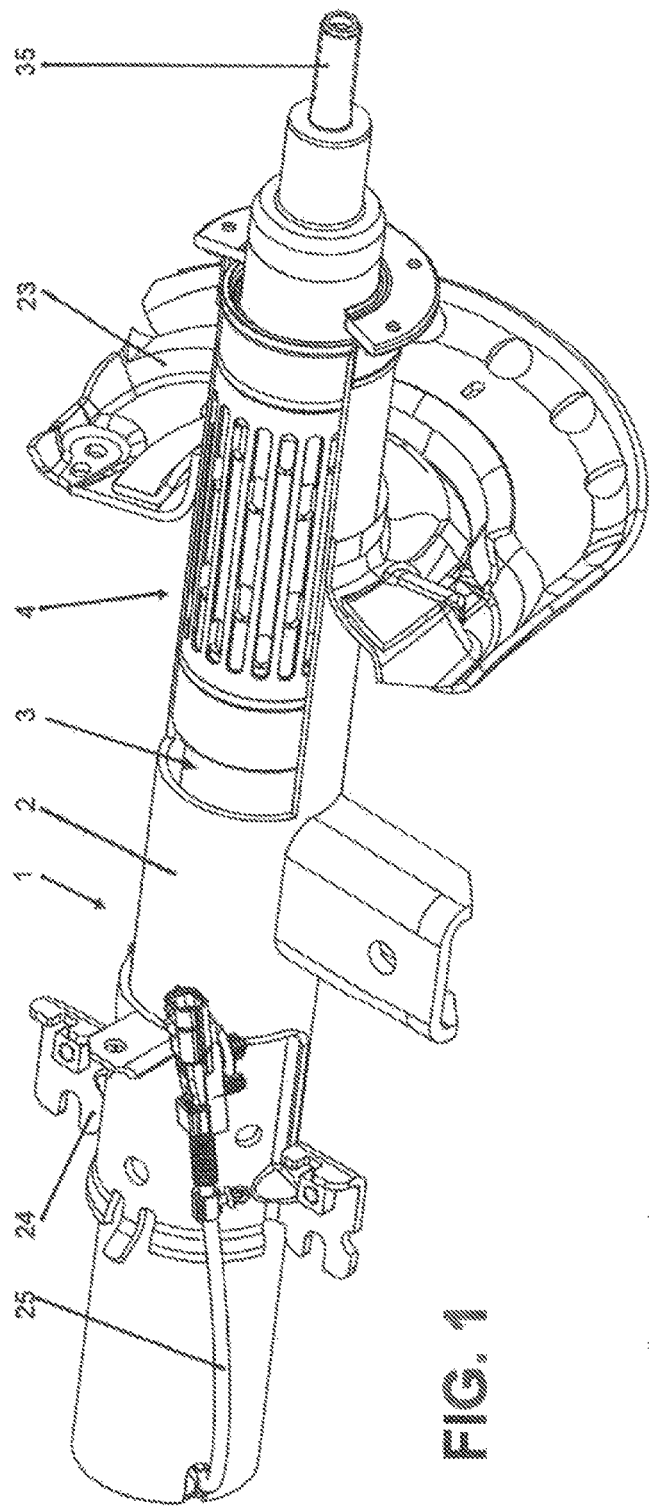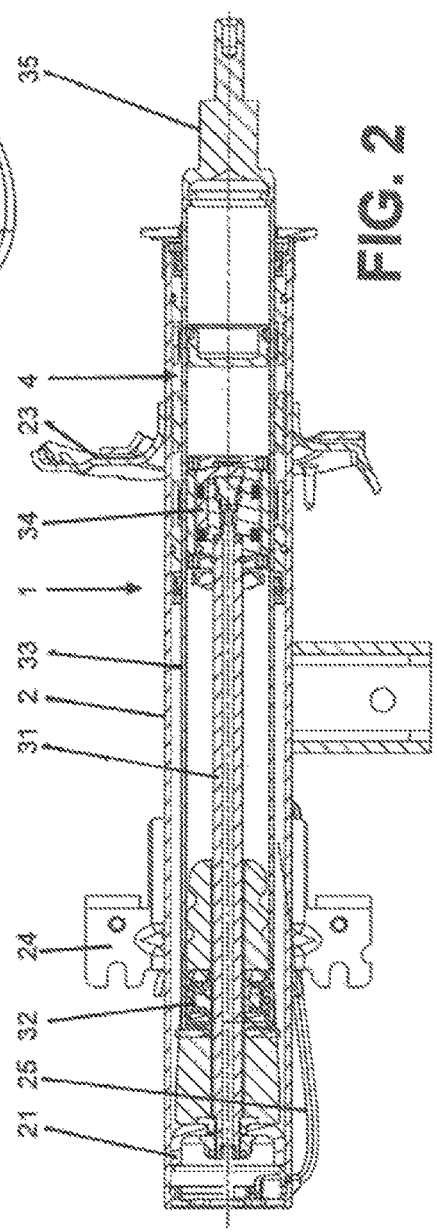

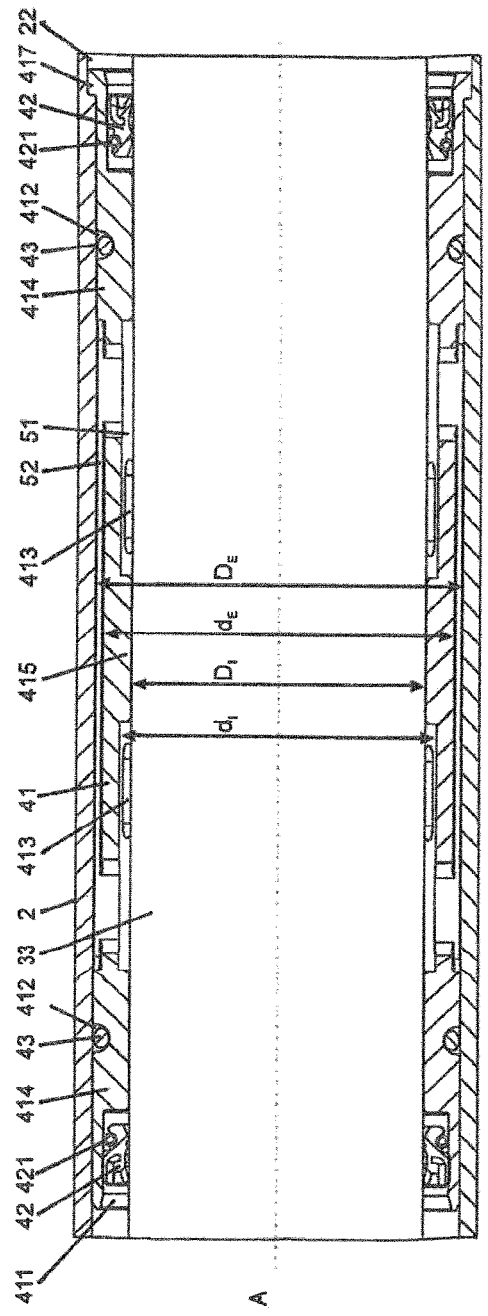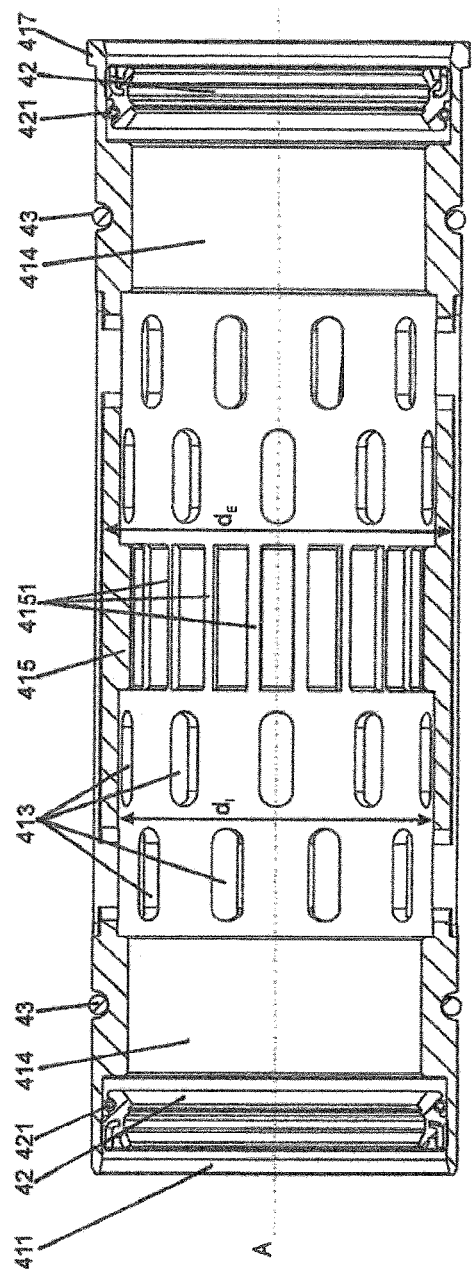

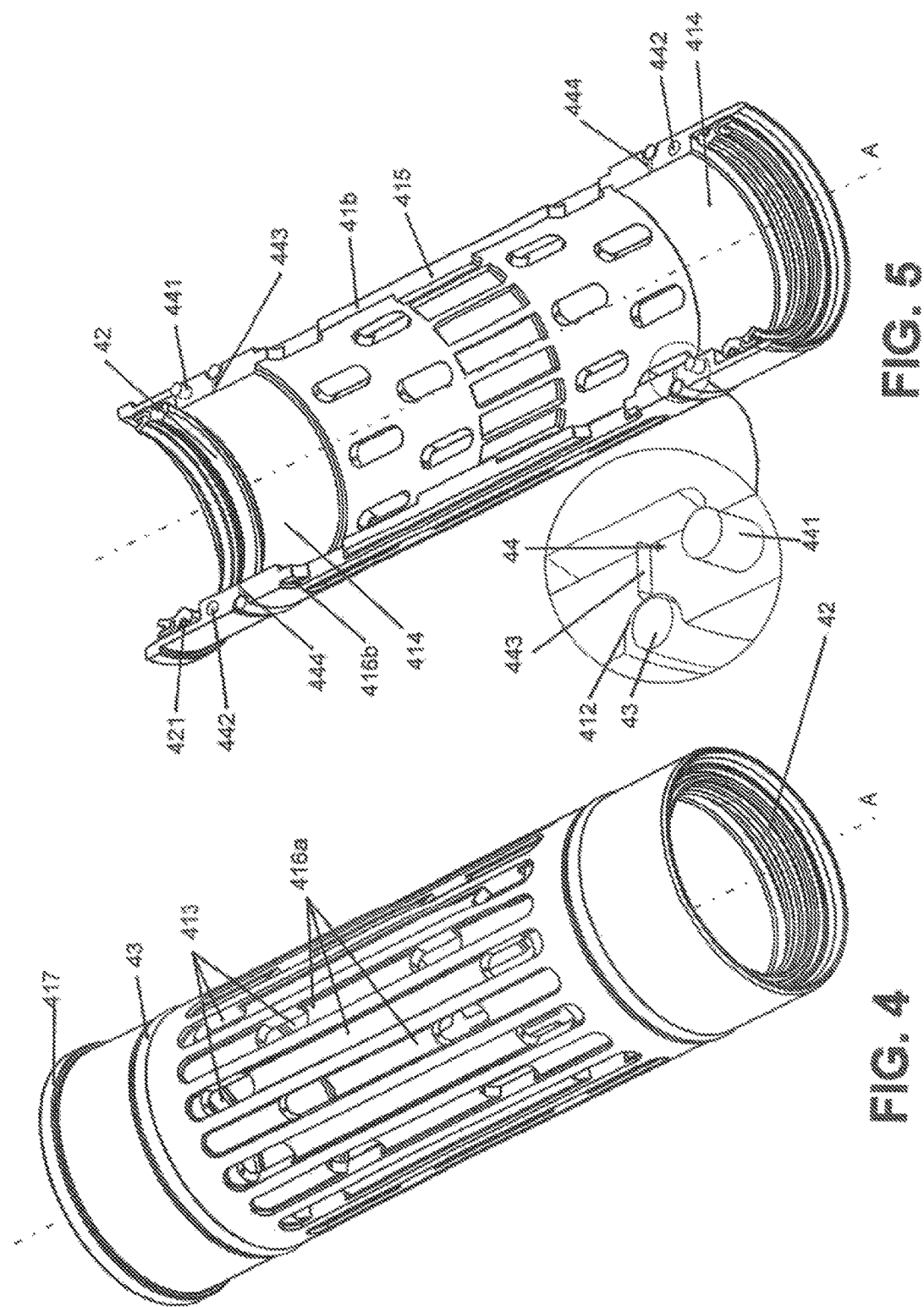

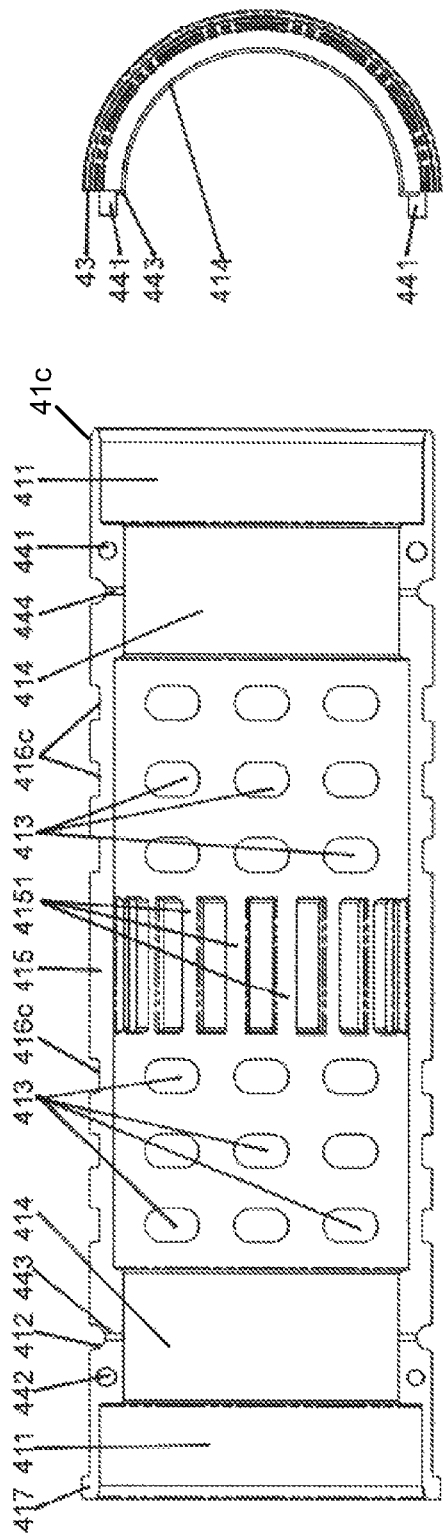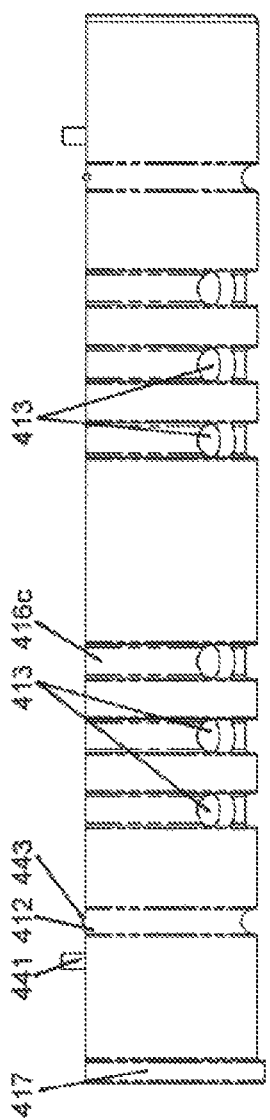

DAMPING STRUT

RELATED APPLICATIONS

The present application claims the benefit of U.S. Provisional Application No. 62/443,834, filed on Jan. 9, 2017.

STATEMENT REGARDING FEDERALLY SPONSORED RESEARCH

NONE.

TECHNICAL FIELD

The invention relates to a damping strut, in particular to a magneto-rheological monotube strut suitable to be used in automotive McPherson suspension systems and a bearing assembly for the strut.

BACKGROUND OF THE INVENTION

A damping strut of this type that may function as part of a vehicle suspension's load bearing structure is disclosed in the publication U.S. Pat. No. 5,984,060. The load bearing assembly is responsible for proper guiding, side load transfer and damper heat transfer and dissipation, while ensuring as low friction as possible and to this end a quantity of oil is carried between a damper body tube and a bearing sleeve thereby providing lubrication between annular bearings and the damper body tube.

Typically, Teflon ® coated bronze bearings on a steel substrate, also called DU bushings, are employed as annular bearings and are press fit into a machined steel bearing sleeve which increases the weight of the bearing assembly. The bearing sleeve in turn is inserted into a housing tube and the latter is crimped inside at a few points over its perimeter to secure the bearing sleeve in place. Unfortunately, this crimping process may cause the bearing sleeve to deflect and thus increase friction between the annular bearings and the damper body tube. Also, the DU bushings create an unpleasant noise as the damper body tube moves in the strut which is audible even in the passenger compartment.

An object of the present invention is to provide a damping strut devoid of the aforementioned drawbacks and featuring: reduced production costs and reduced total weight of the strut; exclusion of the possibility of a deflection of the bearing sleeve during damper assembly that could adversely increase friction; improved heat dissipation; reduced risk of misassembly and problems with tolerances stack-up between assembled components; and reduced noise generated during strut operation.

SUMMARY OF THE INVENTION

The strut comprises a housing tube, a damper body tube, and a bearing assembly disposed between the housing tube and the damper body tube. The bearing assembly comprises a bearing sleeve, which is provided with two annular bearings within the bearing sleeve and bearing against the damper body tube, and two internal annular seals abutting the radially external surface of the damper body tube and defining a fluid-tight internal lubricant chamber filled with lubricating oil between said internal annular seals.

Therefore, a damping strut according to the present invention features annular bearings that are integral with the bearing sleeve; the bearing assembly further comprising two external annular seals abutting an internal surface of the housing tube and defining an external lubricant chamber between the external annular seals and the housing tube; and the bearing sleeve further comprising a number of, at least two, radial channels passing through its wall and joining the internal lubricant chamber with the external lubricant chamber.

Preferably the external surface of the bearing sleeve is provided, between the external annular seals, with an annular recess having a diameter that is smaller than the internal diameter of the housing tube.

Preferably the internal surface of the bearing sleeve is provided between the internal annular seals with an annular recess having an internal diameter that is greater than the external diameter of the damper body tube. The annular recesses additionally increase heat transfer and dissipation in the strut.

The bearing sleeve is preferably further provided with at least one auxiliary annular bearing disposed between the annular bearings and bearing against the damper body tube. Preferably the auxiliary annular bearing is provided with a number of, preferably equiangularly spaced, axial channels allowing for a lubricant flow. The auxiliary annular bearing additionally improves the guiding properties of the bearing sleeve.

Radially external outlets of the at least two radial channels are preferably coupled with at least one axial cross-flow channel. Radially external outlets of the at least two radial channels are preferably coupled with at least one annular cross-flow channel. The cross-flow channels, similarly to the annular recesses, additionally increase heat transfer and dissipation.

Preferably, the bearing sleeve is assembled from at least two axial pieces. Such axial pieces are more feasible for mass-production technologies, like injection moulding processes, than integral cylindrical parts.

Preferably each of the axial pieces is provided at its surface adjacent to the surface of the neighbouring axial piece with locking means matching each other. Locking means facilitate a process of assembling the pieces to form a complete body of the bearing sleeve.

Preferably the bearing sleeve is made of plastic, preferably polyethylene, preferably in an injection moulding process. This reduces the total weight of the bearing assembly.

BRIEF DESCRIPTION OF THE DRAWINGS

The invention shall be described and explained below in connection with the attached drawings in which:

FIG. 1 illustrates a monotube strut assembly provided with an embodiment of a bearing assembly according to the present invention in a schematic axonometric view with a partial cross-section;

FIG. 2 illustrates the strut shown in FIG. 1 in an axial cross-sectional view;

FIG. 3A illustrates the bearing assembly according to the present invention in an enlarged axial cross-sectional view of FIG. 1 and FIG. 3B shows a cross-sectional view of the bearing assembly according to the present invention alone;

FIG. 4 illustrates the bearing assembly according to the present invention as shown in FIG. 1 in an axonometric view;

FIG. 5 illustrates a half piece of another embodiment of a bearing assembly according to the present invention in an axonometric view with an enlargement of the locking means; and FIGS. 6A, 6B and 6C show a half piece of a yet another embodiment of a bearing assembly according to the present invention in a side view, FIG. 6A, a front view, FIG. 6B, and a perpendicular side view, FIG. 6C.

DETAILED DESCRIPTION OF PREFERRED EMBODIMENTS

FIGS. 1 and 2 present an embodiment of a magneto-rheological monotube damper assembly 1 according to the present invention and suitable to be used in automotive McPherson suspension systems. It comprises a housing tube 2, a monotube damper 3 comprising a damper body tube 33 filed with a working liquid, closed at one end and disposed slidably within the housing tube 2, a magneto-rheological piston assembly 34 disposed slidably within the monotube damper body tube 33, and connected with a piston rod 31 led outside the damper 3 through a sealed piston rod guide 32 and fixed at its other end to a bracket 21 fixed at a first end of the housing tube 2. At its other end the damper 3 is provided with a connecting projection 35 adapted to be connected to the sprung mass of the vehicle. Electromagnetic coils inside the piston assembly 34 are powered by an electronic control unit (not shown) through a cable 25 and generate heat during damper operation. A bearing assembly 4 is disposed at a second end of the housing tube 2, between the housing tube 2 and the damper body tube 33. A spring seat 23 is fixed to the outside of the housing tube 2 adjacent the second end. At the first end, the housing tube 2 is also provided with a bracket 24 with suitable openings for connection to the unsprung mass of the vehicle at a location such as a steering knuckle (not shown).

As shown in FIGS. 3A, 3B and 4 the bearing assembly 4 comprises a bearing sleeve 41 which in this embodiment is made of polyethylene in an injection moulding process, two internal annular seals 42 abutting the surface of the damper body tube 33, which has an external diameter $D_I$, and two external annular seals 43 abutting the internal surface of the housing tube 2, which has an internal diameter $D_E$.

Each of the internal annular seals 42 has a form of an elastomeric radial shaft seal, also known as a lip seal, and is provided with a garter spring 421 to compensate for seal wear and elastomer material changes. The seals 42 are pressed inside annular recesses 411 at the ends of the bearing sleeve 41 and define an internal lubricant chamber 51 between the seals 42 and the damper body tube 33.

The external annular seals 43 have a form of O-ring seals and are disposed in annular grooves 412 in the bearing sleeve 41 and define an external lubricant chamber 52 between the seals 43 and the tube 2.

The bearing sleeve 41 is tightly pushed inside the housing tube 2 until a retaining ring 417 provided at the end of the bearing sleeve 41 engages a retaining annular recess 22 provided at the end of the housing tube 2. No crimping of the tube 2 inside is therefore necessary to secure the bearing sleeve 41 in place.

The bearing sleeve 41 is further provided with two annular bearings 414 and an auxiliary annular bearing 415, which is located in the middle of the bearing sleeve 41, all having an internal diameter corresponding to the external diameter $D_I$ of the damper body tube 33 and surfaces shaped as an orange peel, being textured or pebbled, to lower the friction coefficient between the bearings 414, 415 and the damper body tube 33. The auxiliary annular bearing 415 is also provided with a plurality, preferably at least twenty, equiangularly spaced axial channels 4151 allowing for a lubricant flow and improved cooling. Between each annular bearing 414 and the auxiliary annular bearing 415 the internal surface of the bearing sleeve 41 is provided with an annular recess having an internal diameter $d_1$ which is greater that the external diameter $D_I$ of the damper body tube 33.

Similarly the external surface of the bearing sleeve 41 is provided with an annular recess having an external diameter $d_E$ which is smaller than the internal diameter $D_E$ of the housing tube 2.

The bearing sleeve 41 further comprises a plurality of, preferably at least forty, oval shaped radial channels 413 passing through its wall and disposed equiangularly in a plurality of, preferably four, annular sections pairwise symmetrical with regard to the auxiliary annular bearing 415 and with an angular phase shift. The channels 413 join the internal lubricant chamber 51 with the external lubricant chamber 52 so that a fluid-tight combined lubricant chamber, comprising chambers 51 and 52, is defined between the internal damper body tube 33 and the external housing tube 2 and which is sealed internally with the annular seals 42 and externally with the annular seals 43.

Liquid oil lubricant is flowing within the combined lubricant chamber lubricating the internal annular bearings 414 and 415 while the damper 3 is in motion.

As shown in FIG. 4 radially external outlets of the radial channels 413 that lie on the same line parallel to the axis A of the bearing sleeve 41 are additionally coupled with axial cross-flow channels 416a which form a kind of a labyrinth for the lubricant and improve heat dissipation.

Another embodiment of a bearing assembly 4 according to the present invention is shown in FIG. 5. In this embodiment the bearing sleeve 41 is assembled from two half pieces 41b. To facilitate assembly of the sleeve 41 each half piece 41b is provided at its surface adjacent to the surface of the second half piece 41b with locking means 44 shaped in the vicinity of the annular grooves 412. In this embodiment these locking means 44 comprise a pair of cylindrical locking projections 441 matching a pair of appropriate locking holes 442 symmetrical with respect to the sleeve axis A, as well as with respect to the surface parallel to the axis A and passing the middle of the internal annular bearing 415. Thanks to such a shaping each two half pieces 41b shall lock together regardless of their orientation before the assembly.

Furthermore the locking means 44 also comprise a pair of radial sealing projections 443 matching a pair of appropriate sealing grooves 444 also symmetrical with respect to the sleeve axis A, as well as with respect to the surface parallel to the axis A and passing the middle of the internal annular bearing 414. The projections 443 and the grooves 444 however are shaped at the annular grooves 412 for the external annular seals 43 in order to improve sealing of the lubricant chamber 5.

Yet another embodiment of a bearing assembly 4 according to the present invention is shown in FIGS. 6A, 6B and 6C. It is also assembled from two half pieces 41c provided with a similar set of locking means 44 in the form of locking projections 441 and locking holes 442, as well as sealing projections 443 and grooves 444.

After assembling the bearing sleeve 41c comprises a plurality of, preferably thirty-six, oval shaped radial channels 413 passing through its wall and disposed equiangularly in a plurality of, preferably six, annular sections pairwise symmetrical with regard to the internal annular bearing 415 and without an angular phase shift.

In this embodiment radially external outlets of the radial channels 413 that lie on the same perimeter are additionally coupled with annular cross-flow channels 416c which form another kind of a labyrinth improving lubricant heat dissipation.

It shall also be obvious for a skilled technician that although the presented embodiment refers to a monotube damping strut it may be also applied in other guide units and dampers designs.

The above embodiments of the present invention are therefore merely exemplary. The figures are not necessarily to scale, and some features may be exaggerated or minimized. These and other factors however should not be considered as limiting the spirit of the invention, the intended scope of protection of which is indicated in the appended claims.

We claim:

1. A magneto-rheological monotube damping strut suitable to be used in automotive McPherson suspension systems, comprising:
   a housing tube, a damper body tube, and a bearing assembly disposed between said housing tube and said damper body tube;
   said bearing assembly comprising a bearing sleeve, which is provided with two annular bearings within said bearing sleeve and bearing against said damper body tube, and two internal annular seals abutting a radially external surface of said damper body tube and defining a fluid-tight internal lubricant chamber between said internal annular seals, and said annular bearings being integral with said bearing sleeve;
   said bearing assembly further comprising two external annular seals abutting an internal surface of said housing tube and defining an external lubricant chamber between said external annular seals and said housing tube;
   said bearing sleeve further comprising a plurality of radial channels passing through its wall and joining said internal lubricant chamber with said external lubricant chamber;
   wherein an internal surface of said bearing sleeve is provided, between said internal annular seals, with an annular recess having an internal diameter ($d_I$) which is greater than an external diameter ($D_I$) of said damper body tube;
   wherein said bearing sleeve is further provided with at least one auxiliary annular bearing disposed between said annular bearings and bearing against said damper body tube; and
   wherein said auxiliary annular bearing is provided with a plurality of spaced axial channels allowing for a lubricant flow there through.

2. The magneto-rheological monotube damping strut according to claim 1, wherein an external surface of said bearing sleeve is provided, between said external annular seals, with an annular recess having an external diameter ($d_E$) which is smaller than an internal diameter ($D_E$) of said housing tube.

3. The magneto-rheological monotube damping strut according to claim 1, wherein radially external outlets of said plurality of radial channels are coupled with at least one axial cross-flow channel.

4. The magneto-rheological monotube damping strut according to claim 1, wherein radially external outlets of said plurality of radial channels are coupled with at least one annular cross-flow channel.

5. The magneto-rheological monotube damping strut according to claim 1, wherein said bearing sleeve is assembled from at least two axial pieces.

6. The magneto-rheological monotube damping strut according to claim 5, wherein each of said at least two axial pieces is provided at a surface of each of said at least two axial pieces adjacent to a surface of a neighbouring axial piece of said at least two axial pieces with a locking means, said locking means engaging each other.

7. The magneto-rheological monotube damping strut according to claim 1, wherein said bearing sleeve is made from a plastic.

8. The magneto-rheological monotube damping strut according to claim 7, wherein said bearing sleeve is made from a polyethylene.

9. The magneto-rheological monotube damping strut according to claim 1, wherein said bearing sleeve is made by an injection moulding process.

10. A magneto-rheological monotube damping strut suitable to be used in automotive McPherson suspension systems, comprising:
    a housing tube, a damper body tube, and a bearing assembly disposed between said housing tube and said damper body tube;
    said bearing assembly comprising a bearing sleeve, which is provided with two annular bearings within said bearing sleeve and bearing against said damper body tube, and two internal annular seals abutting a radially external surface of said damper body tube and defining a fluid-tight internal lubricant chamber between said internal annular seals, and said annular bearings being integral with said bearing sleeve;
    said bearing assembly further comprising two external annular seals abutting an internal surface of said housing tube and defining an external lubricant chamber between said external annular seals and said housing tube; and
    said bearing sleeve further comprising a plurality of radial channels passing through its wall and joining said internal lubricant chamber with said external lubricant chamber,
    wherein said bearing sleeve is assembled from at least two axial pieces, wherein each of said at least two axial pieces is provided at a surface of the each of said at least two axial pieces adjacent to a surface of a neighboring axial piece of said at least two axial pieces with a locking means, said locking means engaging each other.

* * * * *